United States Patent [19]

Ohle et al.

[11] Patent Number: 5,504,576
[45] Date of Patent: Apr. 2, 1996

[54] MONOCHROMATOR

[75] Inventors: Klaus-Michael Ohle, Wentorf; Ingolf Adam, Tornesch; Hans-Peter Buban, Klein Nordende; Hans W. Lutz, Elmshorn, all of Germany

[73] Assignee: Kabelwerke Reinshagen GmbH, Germany

[21] Appl. No.: 331,564

[22] PCT Filed: Apr. 23, 1993

[86] PCT No.: PCT/EP93/00982

§ 371 Date: Oct. 28, 1994

§ 102(e) Date: Oct. 23, 1994

[87] PCT Pub. No.: WO93/22636

PCT Pub. Date: Nov. 11, 1993

[30] Foreign Application Priority Data

Apr. 30, 1992 [DE] Germany .................. 42 14 186.9

[51] Int. Cl.⁶ ..................................... G01J 3/18
[52] U.S. Cl. ........................................... 356/334
[58] Field of Search .................... 356/331, 332, 356/333, 334

[56] References Cited

U.S. PATENT DOCUMENTS

| 3,447,873 | 6/1969 | Ashley et al. ............ 356/334 |
| 3,711,708 | 1/1973 | Dolin et al. . | |

FOREIGN PATENT DOCUMENTS

| 0015607 | 9/1980 | European Pat. Off. . |
| 8134940 | 3/1982 | Germany . |
| 607330 | 5/1985 | Japan . |

Primary Examiner—F. L. Evans
Attorney, Agent, or Firm—Reising, Ethington, Barnard & Perry

[57] ABSTRACT

A monochromator for examining very narrow band ranges of a light spectrum has a fixed inlet slot, a grid illuminated by said slot and rotatively driven by a grid drive, a fixed outlet slot arranged in the angular area of the generated spectrum and at least one cutoff filter arranged in the path of the rays, continuously and swivelingly driven by the grid drive transversely to the path of the rays for filtering out light of orders other than the observed order. The cutoff filter is coupled to the grid drive in such a way that it is synchronically swiveled over the same angle as the grid, covering the desired spectral range.

6 Claims, 3 Drawing Sheets

MONOCHROMATOR

FIELD OF THE INVENTION

This invention relates to a monochromator for examining a narrow bandwidth of a light spectrum.

BACKGROUND OF THE INVENTION

A monochromator for examining a narrow bandwidth or range of a light spectrum is a spectroscopic apparatus having a stop-down which is a narrow bandwidth of a spectrum generated by a grid or grating. Monochromators are known in which a grating is illuminated by light passing through the entry slit and is rotated by a grating drive. A stationary exit slit is disposed within the angular range of the generated spectrum. The swiveled cutoff filter is disposed in the beam path between the grating and the exit slit for filtering out light of the orders other than the order to be examined.

When the grating is rotated, the spectrum passes by the exit slit such that certain light frequencies can be examined depending on the angular position of the grating. An entire spectrum can be scanned if the grating is swiveled continuously.

Gratings are used because of their high resolution but gratings have the disadvantage that they always generate spectrums of several orders. The 0 order cannot be used because it does not allow a spectral analysis. The lower orders have increasing light intensities as well as an increasing dispersion (spectral resolution). The 1st order is used most of the time for reasons of intensity. In this, one disturbing factor can be seen in the fact that the different orders overlap one another. The light of long wavelength of the 2nd order is situated at the location of the light of short wavelength of the 1st order. For this reason cutoff filters are required to allow only light above a cutoff wavelength to pass and consequently are suitable to filter out the light of the 2nd order when examining the light of the 1st order. However, this is possible only within a certain spectral range. If the arrangement operates with a cutoff filter that has a cutoff wavelength of, for example, 800 nanometers (nm), and it is desired to examine light of shorter wavelengths, the cutoff filter must be swiveled out of the beam path and replaced by a filter of shorter cutoff wavelength.

In known monochromators of this type, the cutoff filters consequently are arranged in such a way that they are swiveled in and out of the beam bath if the grating exceeds or falls short of certain rotation angles.

One construction of this type is known from European Patent No. 0,015,6070 B1 (FIG. 2). The cutoff filter according to this publication is moved incrementally by means of a continuous cam disk with a stepped curve. The incremental movement of the cutoff filters interferes with the adjustment of the monochromator, namely because it impairs a highly precise, continuous adjustability.

Another construction of this type is known from German Utility Model No. 8,134,940. In this, a cutoff filter is adjusted continuously via the drive of the grating which is an adjusting knob. However, the adjustment of the cutoff filter is carried out in linear relationship to the adjusting knob, while the grating moves in a sinusoidal fashion. The angular positions of the grating and the filter only correspond at one wavelength. Consequently, it is not adaptable for using filters with several cutoff ranges. In addition, a displacement of the cutoff filter to a different spectral range is very difficult.

A general object of this invention is to provide a monochromator of the type discussed above but which allows arbitrary spectral ranges to be scanned continuously with high accuracy while filtering out interfering orders.

SUMMARY OF THE INVENTION

According to this invention, a monochromator is constructed so that the spectral range which is stopped down by the cutoff filter is stationary with respect to the generated spectrum. For this purpose, the filter stops down a range between two fixed wavelengths in a spectrum of, for example, the 1st order. The spectrum moves with the angular speed of the grating. If the filter is positioned in the corresponding spectral range on its radius relative to the rotation axis of the grating, the filter can be swiveled continuously with the grating. If the filter is swiveled synchronous with the grating, each point on the filter is associated with certain lines of the spectrum. With an arbitrary number of cutoff ranges of the filter, a precise correspondence with the generated spectrum is attained. Interfering influences on the grating drive which would cause vibrations and consequently diminish the resolution are prevented by use of a continuous drive of the filter to avoid jerky movement. As a result, the scanning process can be carried out at a higher speed without reducing the accuracy. Consequently, a separate swiveling of the filter in and out of the beam path by means of a second drive that is arranged separately from the grating drive is no longer necessary. Since the filter is swiveled continuously and synchronously with the grating, the swiveling movement of the grating no longer has to be interrupted in order to exchange the filters. This arrangement allows continuous and very high scanning speeds.

Further, in accordance with this invention, the monochromator is constructed to provide only one filter which is swiveled with the grating and has plural fixed ranges with different cutoff wavelengths. Consequently, interruption of the swiveling movement for changing filters is eliminated.

Further, in accordance with the invention, the filter is disposed closely adjacent the exit slit, on the radius of which the spectrum is focused by the grating. This requires gearing of substantial length for coupling movement of the filter to the movement of the grating. Certain vibration problems may arise if this gearing is constructed as a simple long arm which carries the filter and swivels with the grating. Preferably, the coupling gear comprises a pair of pulleys and a belt drive for coupling the grating and the filter for synchronous swiveling motion. This type of coupling gear operates with a high precision and is capable of high scanning speeds due to its self-damping and power transmission with little vibration and noise.

Further, in accordance with the invention, the drive is constructed to produce sinusoidal motion in particular with respect to the swiveling movement of the filter, such that the lowest possible acceleration forces are attained. Preferably, the torque motor is an electric stepper motor to provide precise control.

A complete understanding of this invention may be obtained from the detailed description which follows taken with the accompanying drawings.

BEST MODE FOR CARRYING OUT THE INVENTION

Figure 1:
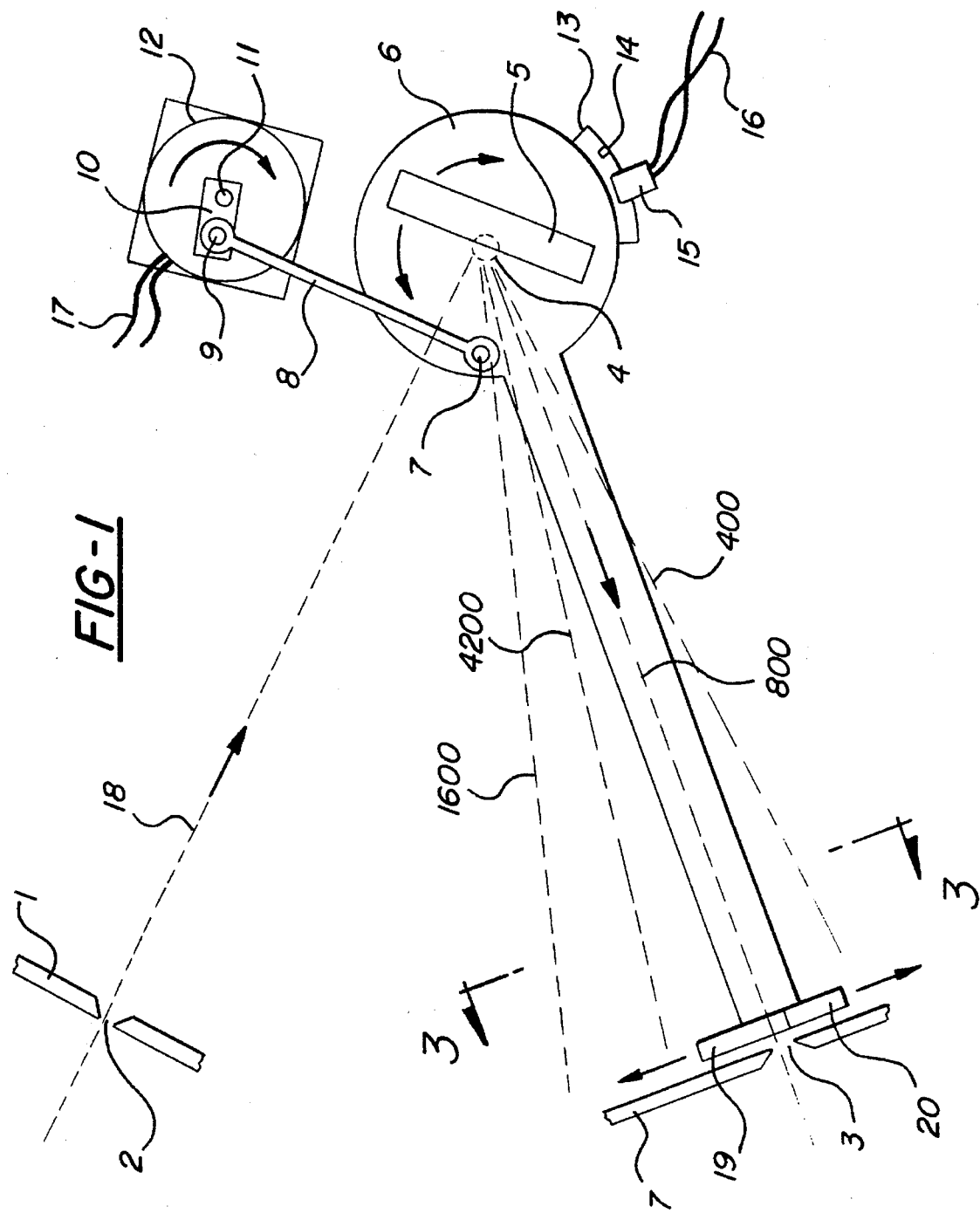
FIG. 1 is a top view of a first simplified embodiment of the monochromator according to the invention.

Referring now to the drawings, there is shown an illustrative embodiment of the invention in a monochromator which is especially adapted for examining very narrow band ranges of a light spectrum in which a cutoff filter is coupled with the grating drive for synchronous swiveling while stopping down the desired spectral range. It will be appreciated as the description proceeds that the invention is useful in various applications and may be realized in different embodiments.

FIG. 1 shows the monochromator in a schematic fashion. It comprises a housing that is situated on a base plate (not illustrated) which extends parallel to the plane of projection. A peripheral wall 1, of which only one section is shown in the figures, provides an entry slit 2 and an exit slit 3.

A grating 5 is swiveled around the rotation axis 4 which is indicated by a circle drawn in broken lines. According to one of the conventional constructions, this grating consists of a flat plate. On the surface of the plate, which extends through the rotation axis, is arranged grid lines in a suitable fashion, e.g., in the form of etched lines. Depending on the design, the surface carrying the grating also can be constructed in a concave fashion.

The grating 5 is mounted on a rotatable plate 6 which is able to turn the grating around the rotation axis 4. For this purpose, a push rod 8 has one end which engages a pivot pin 7 and has its other end connected to a pivot pin 9 of a crank 10 that is fastened onto the drive shaft 11 of an electric stepper motor 12.

If the stepper motor 12 rotates continuously as illustrated by the arrow, the grating 5 swivels back and forth within a certain angular range.

For control of the motor, a certain angular portion of the rotating plate 6 carrying the grating 5 is scanned. For this purpose, a sector plate 13 is provided on the rotating plate 6 as shown in FIG. 1, and carries a marking 14 which is sensed by a light detector 15.

The light detector 15 and the stepper motor 12 are connected to electronic control devices, not illustrated in the figures, via lines 16 and 17. The electronic control devices selectively actuate the stepper motor 12 in order to realize a continuous operation or the adjustment of a certain angular position of the grating 5 and can generate output signals, by means of which evaluation devices (not illustrated) can determine the selected spectral frequency depending upon the angular position of the grating 5.

A light beam 18 (illustrated in broken lines) to be analyzed is projected onto the grating 5 via the entry slit 2 and deflected by the grating in the direction towards the exit slit 3 while being dispersed spectrally. In FIG. 1, the outlet directions for the light wavelengths 400, 800, 1,200 and 1,600 nm of the 1st order are illustrated in broken lines. In the illustrated angular position of the grating 5, the wavelength 800 nm is projected onto the exit slit 3 and isolated by said exit slit monochromatically within a narrow wavelength range. A detector, which is not illustrated in the figures, is able to measure the light intensity.

If the grating 5 is turned towards the right around its rotation axis 4 by a certain angle, e.g., by 5 degrees, the spectrum also is swiveled by the identical angle, i.e., towards the right by 5 degrees. In this, the frequency 400 nm would, for example, be projected onto the exit slit 3. The spectral range can be scanned in this fashion by swiveling the grating 5 via the stepper motor 12. If the stepper motor 12 rotates continuously, the spectral range is continuously scanned up and down. A detector which is arranged behind the slit 3 and connected to an evaluation device consequently can analyze an entire spectrum with a high signal-noise ratio by means of multiple scanning according to the sampling method. If the scanning process is carried out at a high speed, slow changes in the beam 18 also can be examined accurately by means of multiple scanning.

Figure 5:
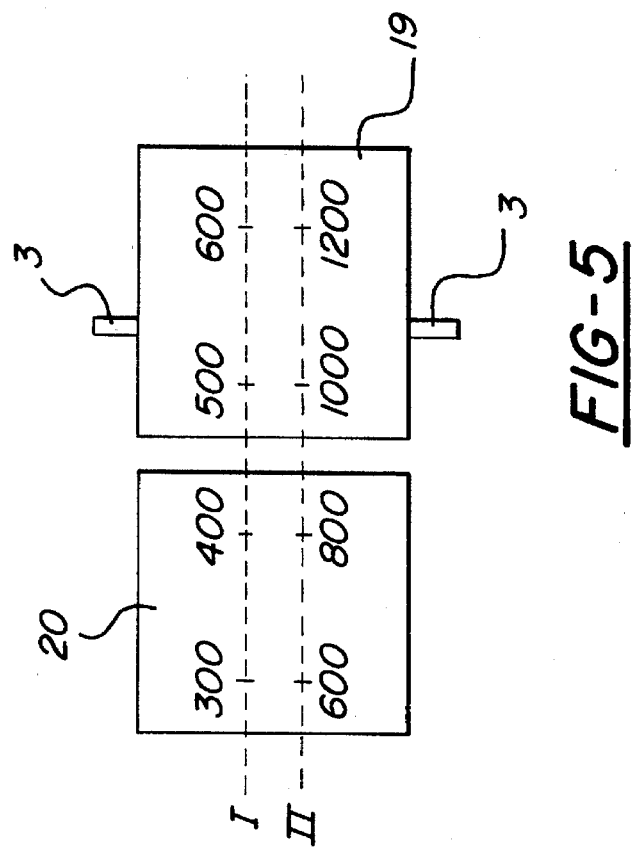
FIG. 5 is a schematic view which corresponds to that in FIG. 3 as well as an illustration of the spectrum of the 1st and 2nd order.
Figure 3:
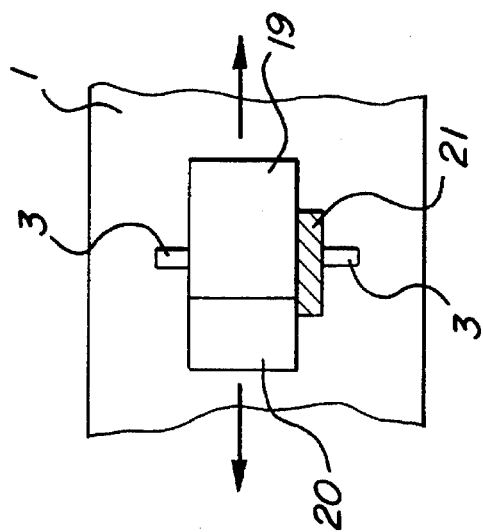
FIG. 3 is a section along the line 3—3 in FIG. 1.

FIG. 5 shows the spectrum on the slit 3 in accordance with the section along the line 3—3 in FIG. 1. It can be observed there that the grating always generates spectrums of several orders. The measurement usually is carried out with the spectrum of the 1st order which has the highest light intensity of all useful orders. The wavelengths of the spectrum of the 1st order are illustrated in nanometers (nm) on the broken line in the lower portion of FIG. 5, the left side of which is identified by the reference numeral I. In the illustrated position of the spectrum, the wavelength 1050 nm of the 1st order is projected onto the exit slit 3.

The wavelengths of the 2nd order are also illustrated in FIG. 5 on the upper broken line. In identical angular positions, they have half the wavelength of the spectrum of the 1st order. Consequently, the wavelength 525 nm of the 2nd order also is projected onto the exit slit 3. The sensor arranged behind the exit slit would detect both wavelengths projected through the exit slit 3 and be unable to differentiate between the aforementioned wavelengths. Consequently, definite results could not be attained.

For this reason, a cutoff filter 19 is arranged in front of the slit 3 as shown in FIG. 5, whereby said cutoff filter only has one cutoff wavelength of, for example, 800 nm, i.e., a filter only allows this wavelength to pass and is impermeable to the penetration of light of shorter wavelengths.

In known monochromators which are constructed according to the state of the art, such a cutoff filter 19 would be arranged in front of the exit slit 3 and remain in this position for evaluating wavelengths of the 1st order in excess of 800 nm. When scanning the spectrum below this wavelength, the filter would have to be swiveled away and replaced by an additional cutoff filter 20 with a cutoff wavelength of 500 nm which can be used for wavelengths of the 1st order up to approximately 600 nm. If only a narrow spectral range is required, one single cutoff filter would suffice.

The filters are moved in a different fashion in an arrangement according to the invention. In a first embodiment illustrated in FIG. 1, the cutoff filters 19 and 20 are situated next to one another on an arm 21 which is fastened onto the rotating plate 6 such that it protrudes radially. Since the spectrum is swiveled such that it exactly follows the rotation movement of the grating 5, the cutoff filters 19 and 20 are swiveled exactly with the spectrum, i.e., they are situated at a fixed angular position relative to the same. Consequently, both cutoff filters 19 and 20 always isolate the spectral ranges which were selected for their cutoff wavelengths. The drive of the grating 5 simultaneously causes the swiveling movement of the cutoff filters 19 and 20.

At high swiveling speeds, the long arm 21 can excite the cutoff filters 19,20 or the grating 5 into vibrations or oscillations even if a sinusoidal drive unit with a crank drive is provided. For this reason, the filter drive is realized in a different fashion in the preferred embodiments according to FIGS. 2 and 4.

Figure 2:
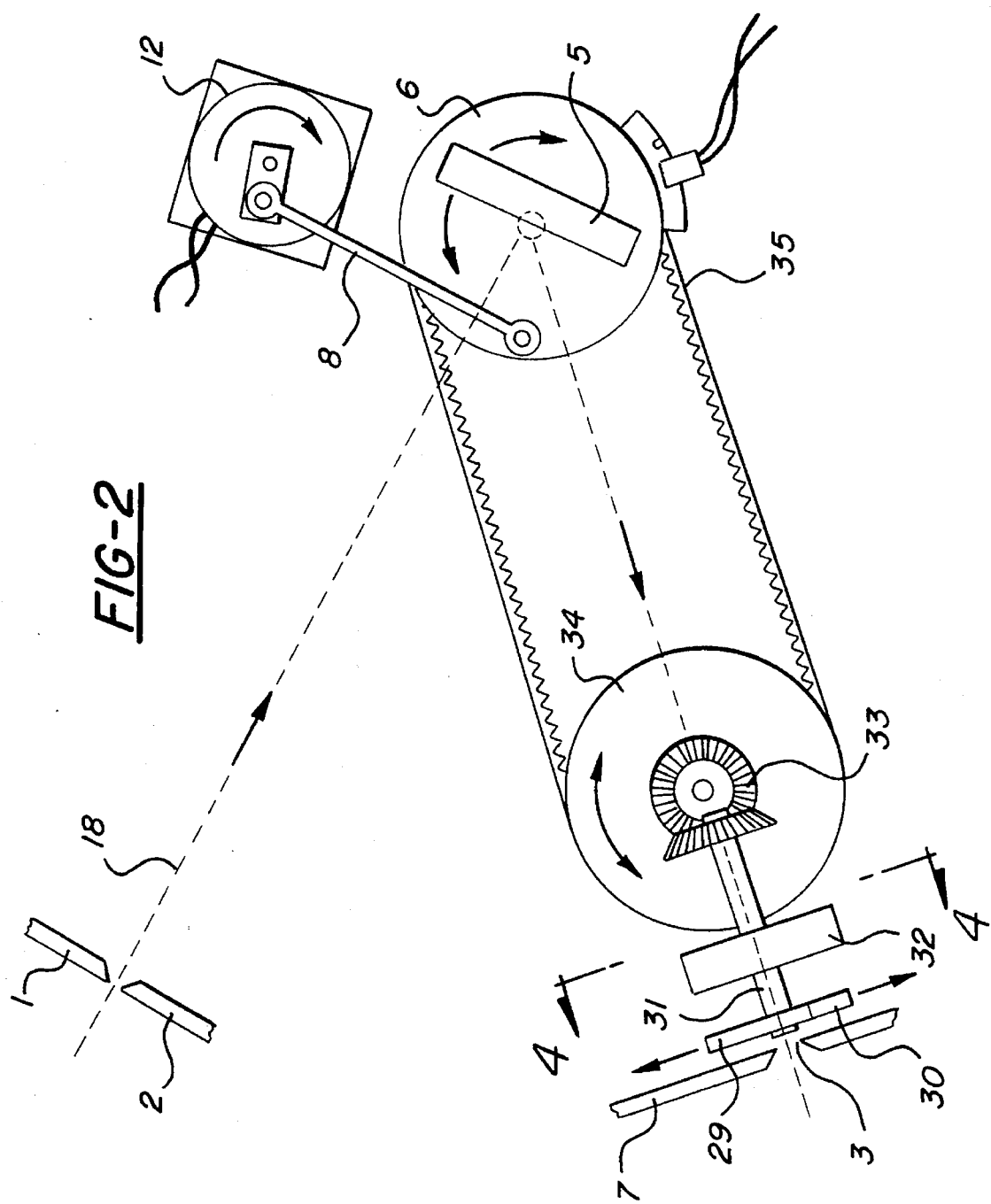
FIG. 2 is a preferred embodiment of the monochromator from a view which corresponds to that in FIG. 1.

A comparison between FIGS. 1 and 2 shows that, although the basic construction of the monochromator is identical, the filter drive is constructed in a different fashion. Corresponding components are identified by identical reference numerals.

Figure 4:
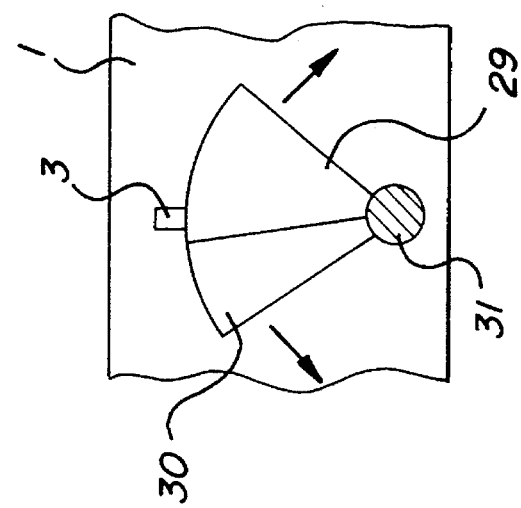
FIG. 4 is a section along the line 4—4 in FIG. 2.

In FIG. 4, which shows a section along the line 4—4 in FIG. 2, cutoff filters 29 and 30 (which function in the same fashion as the cutoff filters 19 and 20) are constructed as sector-shaped disks which are turned by a filter shaft 31. This filter shaft is arranged in a bearing block 32 and driven by a pulley 34 via an angular gearing 33 consisting of bevel wheels. The pulley 34 is driven by means of a toothed belt 35 via the rotating plate 6 which is constructed as a driving pulley, the size of which corresponds with the pulley 34.

During the swiveling movement of the grating 5, the cutoff filters 29,30 carry out the swiveling movement illustrated by the arrows in FIG. 4. Since the coupling gear between the filter shaft 31 and the grating 5 has a transmission ratio of 1:1, the cutoff filters 29,30 exactly swivel past the exit slit 3 with the spectrum, i.e., synchronous with the grating 5 as is the case in the embodiment according to FIG. 1.

Although the description of the invention has been given with reference an illustrative embodiment, it is not to be construed in a limiting sense. Many variations and modifications will now occur to those skilled in the art. For a definition of the invention reference is made to the appended claims.

What is claimed is:

1. In a monochromator of the type for examining narrower band ranges of a light spectrum, said monochromator comprising an entry slit, a grating for illumination by a beam passing through the entry slit, a rotatably mounted grating support member, a grating drive for rotation of the grating support member through a predetermined angular range, an exit slit disposed within the angular range of the spectrum generated by the grating and a cutoff filter means for filtering out light of orders other than the order to be examined, the improvement comprising: said cutoff filter being arranged in the beam path and driven perpendicular to the beam path by the grating drive, said filter being coupled with the grating drive for swiveling movement in synchronism with the grating while stopping down the desired spectral range;

wherein said cutoff filter is rotatably mounted on a filter shaft having an axis extending in the direction of the beam, said filter being divided into plural angular sectors extending radially from said axis, each sector corresponding to one of said ranges, and a coupling gear drivingly connected with said filter shaft for driving it at the angular speed of the grating; and where said coupling gear comprises a driving pulley operatively coupled to a driven pulley, said grating being rotatable with one of said driving pulley and said driven pulley, said filter shaft being coupled with one of said driving pulley and said driven pulley.

2. In a monochromator of the type for examining narrower band ranges of a light spectrum, said monochromator comprising an entry slit, a grating for illumination by a beam passing through the entry slit, a rotatably mounted grating support member, a grating drive for rotation of the grating support member through a predetermined angular range, an exit slit disposed within the angular range of the spectrum generated by the grating and a cutoff filter means for filtering out light of orders other than the order to be examined, the improvement comprising: said cutoff filter being arranged in the beam path and driven perpendicular to the beam path by the grating drive, said filter being coupled with the grating drive for swiveling movement in synchronism with the grating while stopping down the desired spectral range;

wherein said cutoff filter has plural ranges with different cutoff wavelengths, said ranges being disposed in succession in the direction of said swiveling movement;

wherein said cutoff filter is rotatably mounted on a filter shaft having an axis extending in the direction of the beam, said filter being divided into plural angular sectors extending radially from said axis, each sector corresponding to one of said ranges, and a coupling gear drivingly connected with said filter shaft for driving it at the angular speed of the grating; and where said coupling gear comprises a driving pulley operatively coupled to a driven pulley, said grating being rotatable with one of said driving pulley and said driven pulley, said filter shaft being coupled with one of said driving pulley and said driven pulley.

3. A monochromator as defined in claim 1 or claim 2 further including a belt disposed around and operatively coupling said driven and driving pulleys.

4. A monochromator as defined in claim 3 further including bevel gears disposed between and operatively coupling said filter shaft and one of said driven or driving pulley.

5. A monochromator as defined in claim 4 wherein said grating drive comprises a push rod having one end rotatably coupled with said grating support member at a point eccentric to the rotation axis of the grating, a torque motor and a crank driven by the torque motor, the other end of the push rod being driven by the crank.

6. A monochromator as defined in claim 5 wherein said torque motor is an electric stepper motor.

* * * * *